United States Patent [19]

Ryder

[11] 4,091,059
[45] May 23, 1978

[54] METHOD FOR BLOW MOLDING AND COOLING PLASTIC ARTICLES

[76] Inventor: Leonard Benoit Ryder, 5 Sharon Dr., Whippany, N.J. 07981

[21] Appl. No.: 725,693

[22] Filed: Sep. 23, 1976

[51] Int. Cl.$^2$ .................. B29C 17/07; B29C 25/00
[52] U.S. Cl. .................................. 264/28; 264/97; 264/98; 425/526
[58] Field of Search .............. 264/89, 94, 96–99, 264/28, 237, 348; 425/387 B, DIG. 203, DIG. 208, 526; 55/33, 35

[56] References Cited

U.S. PATENT DOCUMENTS

| 3,127,458 | 3/1964 | Scott, Jr. et al. ............... 264/98 |
| 3,233,416 | 2/1966 | Rainwater et al. ............ 264/99 X |
| 3,930,779 | 1/1976 | Farrell .................. 425/DIG. 208 |

Primary Examiner—Jan H. Silbaugh
Attorney, Agent, or Firm—Edward M. Fink

[57] ABSTRACT

A technique for internally cooling a blow molded article with a coolant comprising a mixture of subzero temperature dry air and water. A pressure swing dessicant bed type dryer and chiller are used to supply the dry air having a dew point of the order of −60° F and a temperature ranging from −30° to −50° F for introduction into the blow molded article.

7 Claims, 1 Drawing Figure

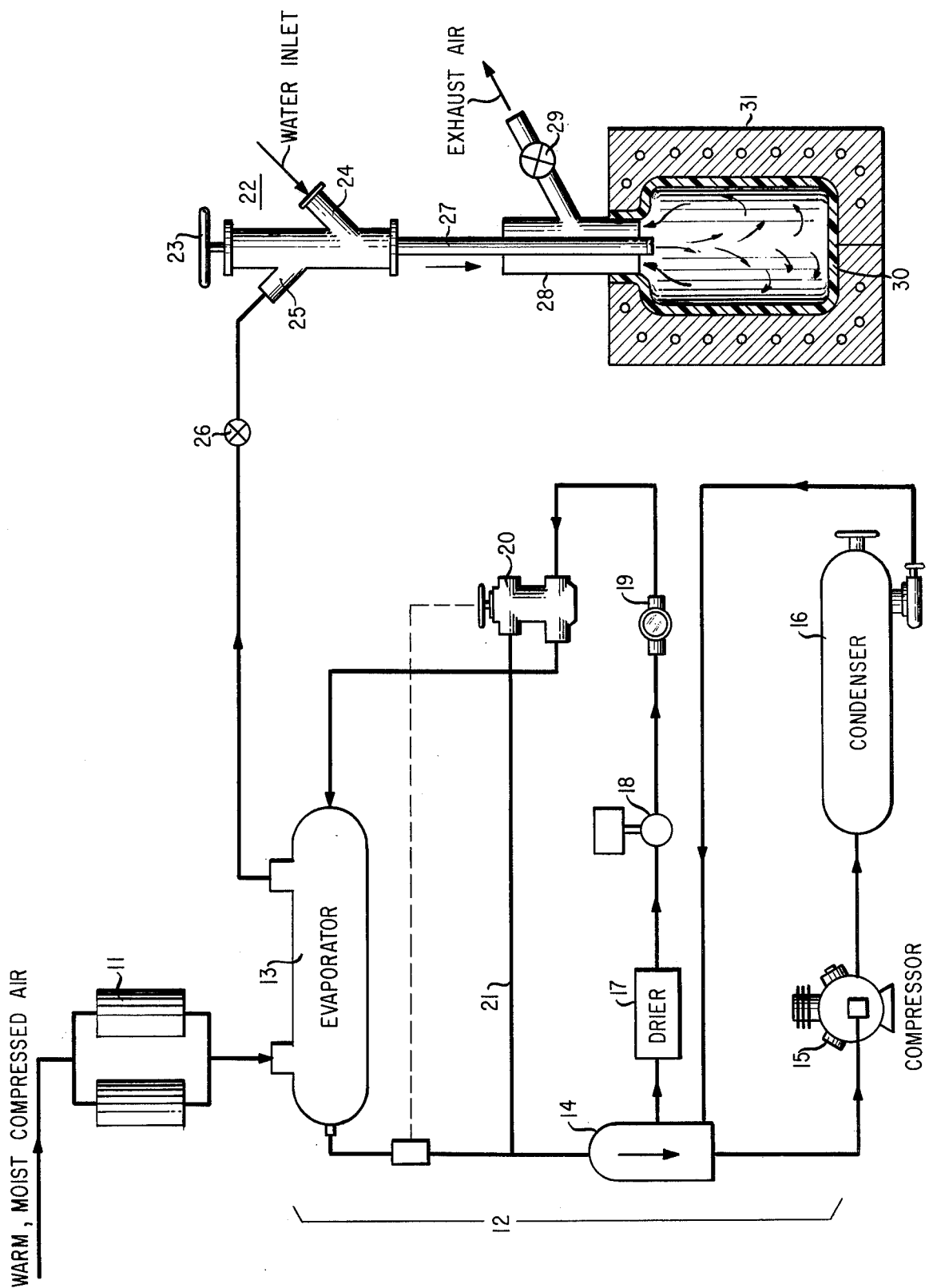

METHOD FOR BLOW MOLDING AND COOLING PLASTIC ARTICLES

This invention relates to the molding of plastics. More particularly, the present invention relates to a method for blow molding hollow plastic materials such as containers comprised of thermoplastic materials wherein rapid cooling of the interior of a newly formed article is effected.

In the fabrication of blow molded articles, it is conventional to extrude a tube or parison of molten plastic from a die and, subsequently, pinch the tube between the halves of a mold and effect internal pressurizing to expand outwardly and into contact with the inner surfaces of the mold parts, so resulting in the formation of the desired shape. Heretofore, it has been common to introduce a coolant such as water into the mold parts to cool the newly formed article externally. Unfortunately, this type of cooling has proven to be slow from a production standpoint and workers in the art have focused their interest upon the development of techniques which effect simultaneous internal and external cooling of the blown articles.

Among the early procedures developed for this purpose was that which involved the use of a stream of dry air maintained at a temperature as low as +40° F as the internal cooling medium. Although this resulted in enhancing the rate of internal cooling, such enhancement was limited to the extent of about 15%. Briefly, this technique involves cycling the cool dry air in and out of the blown article many times during the cooling cycle, a fresh supply of cool air being introduced during each cycle.

Another procedure for attaining the desired end is commonly referred as the Peuchen subzero air system wherein warm, moist compressed air is passed through the well known Peuchen refrigeration system. In the operation of this system, the moisture contained in the air stream is frozen onto the coils or tubes of low temperature heat exchangers and dry air at a temperature and dew point of −55° F emerges from the chilling system and serves as an internal cooling medium when passed through the interior of a container. The chilling and moisture removal process is further enhanced by being made continuous with the use of two refrigerated heat exchangers. In this manner, while entrained moisture is frozen out of the air stream onto the surface of the cold heat exchanger, the other heat exahanger is regenerated by melting off the previously frozen-on layer of moisture. Although this procedure has been reported as being capable of enhancing cooling rates by about 20%, it is prone to so-called "freeze-up" of valves in the system and creates practical difficulties while failing to attain cooling efficiencies described hereafter.

Still another prior art technique for effecting the desired end is known as the "I.S.C." process developed by Hunkar Laboratories. In this procedure, a stream of air is compressed at a pressure ranging from 1100 to 1300 psig and admixed with a small quantity of pressurized water. Then, the resultant mixture is passed through the interior of the blown article which has previously been blown with a stream of air at about 100 psig. Upon entry into the blown article, the highly pressurized air-water mixture expands to the normal blow pressure and provides a Joule-Thomson cooling effect by lowering the air temperature and freezing the moisture present into ice crystals. Next, the ice crystals and cold air strike the inner hot walls of the blown article at which point the ice crystals melt and vaporize. The vapor and cool air are heated and then exhausted from the interior of the blown article continuously. The temperature of the air-ice crystal mixture is about 24° F which is significantly higher than that offered by the Peuchen subzero air system (−55° F); however, the heat removal capability is greater because of the presence of the small amount of moisture which forms an evaporating film on the inside walls of the blown article. The film so formed is found to evidence a heat transfer coefficient which far exceeds that of dry air. Despite the efficiency of this system and its enhanced cooling rate, it suffers from economic limitations due to its high cost and frequent mechanical breakdowns during prolonged operation at high pressures.

Yet another method developed by prior art workers for attaining the desired end is the "Plasti-Cold System" in which liquid carbon dioxide maintained at a pressure of 300 lbs. per square inch and a temperature of 0° F is injected into the interior of the blown article where it expands adiabatically with the pressure of blowing. Thus, for example, if the blowing pressure is set at 100 psig, liquid carbon dioxide will expand to a mixture of liquid carbon dioxide (82%) and vapor carbon dioxide (18%) at a temperature of −58° F. This mixture then removes heat from the blown article upon contact with its hot inner walls. This procedure has been found to be highly effective in removing heat because of low cooling mixture temperatures, for example, −58° F, and the presence of a liquid phase which forms a high heat conducting evaporating film inside the blown article. Unfortunately, this process is also subject to certain limitations. Prior experience has shown that the liquid phase tends to form cumbersome puddling at the bottom of the blown article (when the articles are large in size) when the process is operated in this manner, so reducing the effectiveness of the system in large measure. Additionally, there is an ongoing continual charge for liquid $Co_2$.

In accordance with the present invention, the limitations of each of the foregoing processes are substantially overcome by a novel procedure for internally cooling a blown molded article wherein the cooling is effected by means of an air-water coolant, which is capable of use at a cooling and production rate comparable to the liquid carbon dioxide method. In an alternative embodiment if the degree of cooling required is less than that previously described, an air coolant may be employed. In such cases, the cooling and production rates are found to be comparable to the prior art procedure except for liquid carbon dioxide. In contrast with the previously described I.S.C. system which has as its objective the same end desired herein, the present invention does not require the necessity of expensive high pressure compressors and accessory equipment, but rather provides subzero air-water mixtures at temperatures as low as −50° F or lower without the possibility of freeze-ups occurring in the system. Thus, the system described herein combines the advantages of the Peuchen subzero air system, namely temperatures of the order of −50° F, with the advantages of the I.S.C. system which utilizes small amounts of high heat conducting low cost water while not imposing upon the process the necessity of high costs or the practical difficulties introduced by the known systems. The cooling capability of this system is found comparable or more effective than the liquid carbon dioxide system and has been found superior when used in blow molding of large articles.

The invention will be more readily understood by reference to the following detailed description taken in conjunction with the accompanying drawing wherein the FIGURE is a schematic diagram of a system suitable for use in the practice of the present invention when applied to extrusion blown articles such as containers.

With reference now more particularily to the FIGURE, there is shown a typical system suitable for use in the practice of the present invention. Shown is a pressure swing compressed air dryer system 11 including two desiccant bed dryers, an air chilling system 12 comprising an evaporator 13 and a conventional air chilling system including a subcooler 14, compressor 15, condenser 16, dryer 17, liquid line solenoid 18, sight glass 19, expansion valve 20 and equalizing line 12, and an automatic air brush 22 including an air brush regulating knob 23, water inlet 24 and air inlet 25 into which air is admitted at a rate controlled by blow air solenoid valve 26. Air brush extension 27 is connected to air brush 22 and is adapted to fit inside blow pin 28, adapted with exhaust valve 29, which is connected to blown container 30 in mold 31.

In the operation of the process, air warmed to a temperature ranging from 75°–105° F and maintained at a pressure ranging from 80–400 psig at a dew point temperature of about 75° F is passed alternatively to one of the desiccant bed type dryers 11 in which moisture entrained in the air is absorbed by the desiccant, so resulting in drying of the warm air to a dew point temperature of the order of −60° F. The resultant dry air is next admitted to air chiller 12 wherein it is cooled to a temperature ranging from −30° to −50° F. The procedure involves passing the air to an evaporator which is part of a conventional air chilling system employing a freon refrigerant. The refrigerant system shown in the FIGURE is well known to those skilled in the art. The resultant pressurized, subzero temperature air is then removed from evaporator 13 and passed to automatic air brush 22 through blow air solenoid valve 26. Also admitted to air brush 22 is pressurized water through inlet 24, the air and water streams being physically separated while inside the air brush in order to prevent premature freezeup of the mixture. Appropriate adjustment of knob 23 and the water pressure permits atomization of the cold dry air and water streams to yield a fine mist approximately one to two inches outside the fluid tip of the air brush extension, the fluid tip being maintained within blown container 30. The resultant subzero temperature air-water mist is then flushed in continuous fashion through the inside of the blown article, thereby resulting in rapid cooling of the interior walls upon contact. The mist is heated during the course of this process and is continuously exhausted through blow pin 28 and blow exhaust valve 29.

Suitable variations in the processing scheme as described above may be made. Thus, for example, the cooling rate may be varied by withholding water from the air brush at the start of the cycle, so avoiding the rapid chilling of the walls of the blown article.

As the process reaches its end, the water supply to the air brush is terminated, so insuring that the blown article will be dry. Alternatively, it should be noted that the process may be used in the absence of the water supply and the blown article cooled solely with the subzero dry air as the flushing coolant.

The described technique, as noted above, is superior to the prior art procedures from both a practical standpoint and an economic standpoint. In comparison with the Peuchen method of freezing out moisture from the compressed air stream with its concomitant mechanical freezeup and freeze-thaw requirements, the instant procedure is far simpler and the freezeup phenomenon is incapable of occuring in the drying towers since that operation is effected at the same temperature as the entering air. Other expedients such as the ability to regenerate the desiccant bed by depressurizing the tower containing it and reactivation with a portion of the process gas flow adds to the merits of the process.

Although the invention has been described with respect to extrusion blow molding process, it will be appreciated by those skilled in the art that the process is also applicable to injection blow molding. It will be understood that air introduced to the air brush may range in temperature from 40°–75° F, that is, chilled to a moderate temperature level above the freezing point of water.

What is claimed is:

1. A process for the preparation of a blow molded article which comprises the steps of shaping a thermoplastic polymer material in a mold cavity with a pressurized gaseous blowing medium to form a hollow shaped article and cooling the article, the improvement which comprises effecting said cooling by
    (a) introducing air having a temperature ranging from 75°–105° F and maintained at a pressure ranging from 80–400 psig at a dew point of about 75° F to a pressure swing dessicant bed type dryer, so resulting in drying of said air to a dew point of the order of −60° F,
    (b) passing the resultant dried air to a chiller wherein it is cooled to a temperature ranging from −30° to −50 ° F, and
    (c) introducing said chilled air into and continually flushing it through the blow molded article.

2. Process in accordance with claim 1 wherein said chilled air is continuously mixed with water to form a cold air-water mist.

3. Process in accordance with claim 2 wherein the chilled air precedes the introduction of water into the system, thereby avoiding premature cooling.

4. Process in accordance with claim 3 wherein the water supply is terminated a fraction of a second prior to termination of the cooling cycle so avoiding the presence of residual moisture in the blown article.

5. Process in accordance with claim 2 wherein the water is mixed with chilled air prior to entering the blown article.

6. Process in accordance with claim 2 wherein the water is mixed with chilled air subsequent to the air entering the blown article.

7. Process in accordance with claim 2 wherein the water supply is terminated a fraction of a second prior to termination of the cooling cycle, so avoiding the presence of residual moisture in the blown article.

* * * * *